Inventor:
HORST PRIEBS

Inventor:
HORST PRIEBS

Feb. 24, 1970

H. PRIEBS 3,497,680

METHOD AND APPARATUS FOR ISSUING ELECTRIC
CONTROL PULSES BY CONTACT SWITCHING IN
KEY-ACTUATED ACCOUNTING, CALCULATING
OR THE LIKE MACHINES

Filed Feb. 1, 1968

Inventor:

HORST PRIEBS

United States Patent Office 3,497,680
Patented Feb. 24, 1970

3,497,680
METHOD AND APPARATUS FOR ISSUING ELECTRIC CONTROL PULSES BY CONTACT SWITCHING IN KEY-ACTUATED ACCOUNTING, CALCULATING OR THE LIKE MACHINES
Horst Priebs, Bielefeld, Germany, assignor to Anker-Werke Aktiengesellschaft, Bielefeld, Germany, a corporation of Germany
Filed Feb. 1, 1968, Ser. No. 702,458
Claims priority, application Germany, Feb. 16, 1967, A 54,928
Int. Cl. G06c 29/00
U.S. Cl. 235—60.4
19 Claims

ABSTRACT OF THE DISCLOSURE

Coded electric control pulses are issued to signal circuits in an accounting, calculating or the like machine under control by mechanical switch contacts of an encoder in series with the bank contacts of a selector switch device which operates as a digit-position discriminator by having its movable wiper contact advanced in accordance with the digitwise advance of the carriage or other digit-position determining member of the machine. The switch contacts of the encoder are normally closed. Depressing any amount key of the machine keyboard causes mechanical opening of the encoder switch contacts in those signal circuits that must not participate in transmitting the coded signals. The wiper of the discriminator is normally off and temporarily wipes over the next bank contact after opening of the encoder switch contacts so that the signal issues through the engaged one bank contact and the remaining, then still closed encoder contacts.

---

My invention relates to a method and apparatus for issuing data-denoting control signals by mechanical contact switching under control by the amount-posting keys of an accounting, calculating or the like machine.

The generally known devices of this kind operate on a signal-issuing principle which involves exciting the signal circuits by closing a normally open, mechanical contact of the keyboard-controlled switches. These mechanically actuated contacts, however, tend to bounce when closing. This may cause defective signals such as oscillatory or multiple pulses, and thus produce faulty operations of rapidly responsive signal receivers, for example those equipped with bi-stable flip-flops, stepping-switch relays, keyers or timers and the like. In this respect, multiple pulses due to contact vibration or bouncing are particularly detrimental.

Since the switching devices are keyboard actuated, it is infeasible to prevent faulty pulses by applying higher contact pressures, because increasing the contact pressure has the consequence of an undesired high resistance to key actuation or demands an unduly extended key travel.

It is an object of my invention therefore to afford the issuance of electrically clean signal pulses by keyboard actuated contact switching in data processing machines, without entailing the above-mentioned shortcomings and limitations heretofore encountered with such pulse-switching operations.

Another conjoint object of my invention is to secure a mechanically controlled and key-actuated switching for the transmission of coded data that is so securely protected from affecting the signals by contact vibration or bouncing that clean electric signal pulses are issued with the operational reliability required for highly exacting data-processing purposes. More specifically, it is an object to issue electrically clean pulses, directly under mechanical control by the keyboard of a data-processing machine or other control-pulse transmitting data-entering device, in cases where the data or values posted are to be checked by a testing apparatus, such as an account-number checking apparatus, in order to ascertain whether a posted number is correct, and in which the machine operation is released only in the event of coincidence. The issuance of perfect single pulses without spurious frequencies is also a prerequisite for the control of punch-tape and punch-card equipment, electronic computers, remote registering devices, coding equipment, value-storing memories and other pulse-controlled equipment for data processing or the like purposes; and it is within the scope of the above-stated objects of my invention to provide such pulses under control by switches operated mechanically by actuation of the amount posting keys of a calculating or the like machine.

Furthermore, the conventional apparatus with key-controlled value-transmission devices have the disadvantage that the issuance of uncoded value pulses for each amount key requires a separate electric signal lead for each key. This particularly applies to the use of the known crossbar system as proposed, for example, in the German published patent application 1,131,435 for machines with a ten-key keyboard. This known system requires 10 switch contacts for each individual decade; and the posting of two and three zeros by depressing only one key for "00" or "000," known from several totalizing machines, is not feasible with this system.

It is another object of my invention to also improve and simplify in machines and apparatus of the above-mentioned kind the circuitry and appertaining mechanical switching components needed for producing and utilizing the value-denoting pulses; and it is also an object to render such equipment readily applicable with multiple-cipher keys.

My invention is predicated upon the provision of an accounting, calculating or the like machine having value-posting key means, preferably a keyboard of the ten-key type, and a carriage or other member which moves stepwise, one digit step after another, with each posting of a digit value. For the purpose of the invention, I provide such a machine with data-denoting signal circuits for issuing respective signals to a signal receiver, and serially connect a contact switch in each signal circuit, the switches being selectively controllable by the key means. I further provide the machine with a digit position discriminator which is essentially a selector switch device with a bank of contacts series connected in the respective signal circuits, and travel of the movable slide or wiper contact of the discriminating selector being controlled by the movement of the carriage or other digit-position denoting member of the machine.

Relating to such an organization, and in accordance with one of the features of my invention, I hold the contact switches in the data-denoting signal circuits closed when the key means are in the inactive condition, and I open during actuation of the key means—but prior to issuance of a control pulse—all of those contact switches in the signal circuits that do not denote the value then being posted by the key means, whereafter I engage the proper one bank contact by the wiper contact, and issue a control pulse through the one engaged bank contact and through the other, then still closed contact switches.

According to another feature of the invention, the issue of the data-denoting signal pulses is effected through a plurality of the above-mentioned, mechanically actuated switch means coacting in accordance with a code system, and for issuing a signal pulse denoting the value "zero" one or more of the data-denoting circuits remain closed by the switch means.

According to further features of my invention, the above-described pulse-issuing method is performed with the aid of apparatus in which several control sliders are coordinated to the value-denoting keys and act on the respective normally closed contact switches so as to open them selectively when any one of the amount keys is being depressed. The control sliders then open those data-denoting signal circuits that, in accordance with the code system employed, are not to remain closed for issuing the particular control signal required.

According to still other features relating to machines with a ten-key keyboard and the issuance of coded value signals, I provide code converting control sliders which are controlled by the amount-posting keys and which, in accordance with the chosen code act in the opening sense upon the normally closed switch means; and I issue the pulses, in accordance with their correct digital positions, through a selector or discriminator switching device travelling in synchronism with the carriage or other machine member positionally correlated to the digit positions.

The above-mentioned and further objects, advantages and features of the invention, said features being set forth with particularity in the claims annexed hereto, will be apparent from, and will be mentioned in the following with reference to embodiments of the invention illustrated by way of example on the accompanying drawing in which:

FIG. 1a is the circuit diagram of a modified encoder switch device equipped with one-way encoder switches, this device being applicable as a component of a circuit diagram otherwise as shown in FIG. 1.

FIG. 2 is a line diagram of the tetradic code 1–2–3–6 which is embodied in the circuits of FIGS. 1 and 1a.

Figure 1:
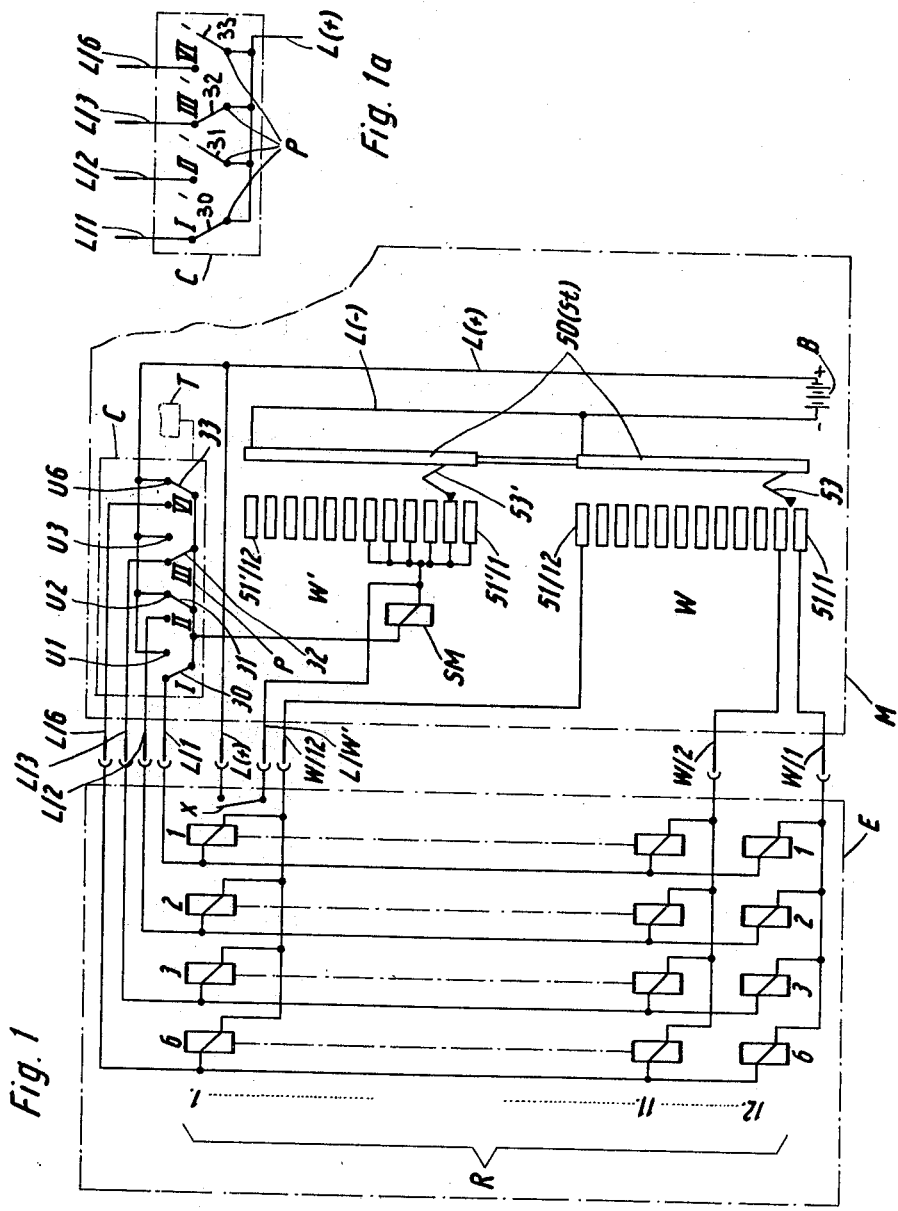
FIG. 1 is a circuit diagram for performing the method with two-way encoder switches controlled by a ten-key machine connected to a relay memory of an account-number checking device.

The main units of the equipment illustrated in FIGS. 4 to 10 and schematically represented in the circuit diagram of FIG. 1 comprise a calculating, accounting or the like data processing machine M with a data input device T comprising the amount posting keys of a keyboard which, in the example described, is essentially of the ten-key type. That is, the keyboard has only ten keys for posting the respective numerals 1 to 9 and 0, although the illustrated embodiment is provided with two additional keys for posting double and triple ciphers ("00" and "000") so that there are a total of twelve individual keys according to the twelve horizontal lines in the code diagram of FIG. 2.

The keys of the input device (keyboard) T control an encoder switch device C whose contact switches conjointly operate to translate each posted individual digit amount in accordance with the tetradic code 1–2–3–6 (FIG. 2) by selecting corresponding signal circuits connected to a signal receiver E. The receiver is exemplified by the relay memory R of an account-number checking unit. After the encoder switches in device C are set, the signal circuit of one of the memory relays in the receiver E is further prepared by a digit-position discriminator W which has respective contacts 51/1 to 51/12 of a group or bank connected in series with the signal circuits and has a wiper contact 53 sequentially engaging the bank contacts in synchronism with the travel of a carriage or other travelling member St of the machine M. The travel of member St is positionally correlated to the decimal or digit positions of the amounts being processed. The wiper or slide contact 53 is normally disengaged from all of the bank contacts. Each time the member St travels one digit step, the wiper contact engages and passes beyond the next bank contact. During the interval of contact engagement a pulse is issued in the selected one signal circuit.

According to the invention, the issuance of electrically clean control pulses under control by the key-controlled mechanical encoder switches requires that the data-denoting signal circuits be equipped with normally closed (NC) switch contacts in the encoder C and that these NC-contacts be electrically connected in series with the respective bank contacts of the digit-position discriminator W whose wiper sequentially engages the bank contacts. It is further essential for producing an electrically clean pulse that the value-denoting or encoder switches are closed in the condition of rest of the machine, and that for transmitting value-denoting pulses those of the normally closed contacts are opened that do not participate in the issuance of the control pulse, whereas the remaining switching means, then still closed, remain closed when the control pulse is being released through the wiper contact of the discriminator. As a result, no spurious pulses as may be due to bouncing effects can occur in the signal transmitting control circuits.

The switches I, II, III and VI in the encoder device C may each be provided with the above-mentioned normally closed contact only. This applies to the embodiment of the encoder device C shown in FIG. 1a. However, aside from the NC-contact in the signal circuit to be controlled, each of these encoder switches may be of the two-way type and hence may also have a normally open (NO) contact as is the case with the embodiment of the encoder device C shown in FIG. 1 where the normally open contacts are denoted by U1, U2, U3 and U6.

The NC-contact of each encoder switch is connected by a signal line L/1, L/2, L/3 and L/6 respectively with each decade of memory relays in the receiver E. Each decade of memory relays has as many individual relays as there are numerals or data available for the individual digits. Hence according to FIG. 2 there are ten relays for numerals 1 to 9 and 0, plus two further relays for "00" and "000." Each four covalent relays of the twelve decades have their output ends connected to a respective one of twelve signal lines W/1 through W/12, and these output leads extend to respective bank contacts 51/1 through 51/12 of the discriminator W whose movable wiper contact 53 moves in synchronism with the machine carriage St.

As mentioned, the invention requires the actuation of the data input means, namely the depression of the amount keys T, to initially effect opening of all those NC-contacts in the encoder C that must not be closed for issuing the particular signal corresponding to the coded amount to be transmitted to the receiver E. For example with the code 1–2–3–6 (FIG. 2), the posting of the amount "4" must have the effect of opening the encoder switches II and VI. This is the case in FIG. 1 as well as in FIG. 1a but is most readily apparent from FIG. 1a showing that the circuit of line L/2 is opened at P–II and the circuit of line L/6 is opened at P–VI, whereas the circuit of line L/1 remains closed at P–1 and the circuit of line L/3 remains closed at P–III. The movable contact members 30, 31, 32 and 33 of the respective encoder switches I, II, III and VI are all connected to the positive bus lead L(+) coming from the positive pole of the current source B, and the wiper contact 53 of the discriminator W is connected to the negative bus lead L(−) coming from the negative pole of the same source B. Each signal circuit therefore extends through the code-selected switches in the encoder C and through the correspondingly selected memory units of the receiver E in series with the discriminator W which performs its operation only after the encoder switches of device C have been set. The receiver E may be located remote from the machine M and may be exchangeable for use with other data-processing machinery, this being indicated in FIG. 1 by plug connections interposed in each of the lines L/1 to L/6, W/1 to W/12 and L(+).

During switching of the encoder contact members 30 to 33 in device C, the machine member St whose traveling positions are in accordance with the digit positions of the amounts being processed, for example a carriage jumping from decade to decade, is set in motion. This digitally advancing carriage or machine member St entrains, or causes to synchronously advance, the above-mentioned wiper contact 53 which thus passes from digit position to digit position and sequentially engages the respective bank contacts to complete a selected one signal circuit between the negative bus L(−) of the current source B and the signal receiver E through the respective leads W/1 to W/12, each time maintaining the circuit closed for a short interval of time. Whenever the circuit is completed through a selected signal line L/1, L/2, L/3 and/or L/6, a switching pulse free of bouncing is imparted to the selected memory unit of the receiver E.

In the embodiment of the encoder device C shown in FIG. 1, the movable switch members 30 to 33 cooperate not only with the NC-contacts of the signal circuits but also with NO-contacts U1, U2, U3, U6 which are all connected to the positive bus L(+). In this embodiment the circuit from the positive bus L(+) to the encoder C and to the receiver E is closed only after at least one of the NO-contacts U1, U2, U3, U6, has closed, which takes place after the opening of those signal circuits that are to remain inactive for transmitting the particular bit being encoded. The delayed closing of a contact between the encoder device C and the positive bus L(+) by means of a non-bouncing switch is to take place shortly after the commencement of the mechanical contact engagement of the wiper contact 53 with the next bank contact in the discriminator. This prevents any current peaks occurring at the commencement of the mechanical contact engagement at the wiper contact from being transmitted to the signal receiver E. This is apparent from the time diagram of FIG. 3. The abscissa in this diagram (horizontal reference direction) denotes time. The lowermost curve relates to the depressing motion imparted to the posting key T, and the ordinate (vertical) reference indicates the amount of key travel. The other curves in FIG. 3 indicate, in proper time relation to the actuation of the key, the opening interval of the NC-contacts I, II, III, VI and the closing interval of the NO-contacts U1, U2, U3, U6, as well as the signal duration on the signal lines W/1, W/12, W/00 and W/000. It will be seen from FIG. 3 that shortly after the depressing travel of the key T commences, one or more of the NC-contacts (I, II, III, VI) will open at the moment $t_A$ and that the corresponding NO-contacts (U1, U2, U3, U6) will close at a slightly later moment during the continuing depressing travel of the key T. During the interval $t_U$ elapsing between the opening moment $t_A$ of the NC-contact and the closing moment of the NO-contact, that is at a time when the signal leads do not yet conduct current, the wiper contact 53 in the scanner device W enters into mechanical contact engagement with the next bank contact. The interval of contact closure of the wiper contact, advancing in synchronism with the carriage which jumps from decade to decade under the action of a decreasing spring tension, becomes gradually prolonged from the first decade jump W1 to the last decade jump W12. While the depressed key T returns to its inactive position, the previously closed NO-contacts in the double-pole switches of the encoder C open, so that the signal transmitting lines L1, L2, L3 and L6 are disconnected at a moment when the mechanical contact engagement W1 to W12 of the wiper contact in device W is still in effect. The beginning of a pulse transmission through the wiper contact to the receiver E, therefore, is controlled by one of the NO-contacts U1 to U6, whereas the end of a signal through the wiper contact may also occur at a moment when an NO-contact U1 to U6 is still closed, the latter being the case when posting the cipher keys T/00 and T/000 in accordance with the graphs W/00 and W/000 in FIG. 3.

While the method and principle described in the foregoing with reference to FIGS. 1 to 3, may be embodied in a great variety of different data-processing machines, the example mentioned above and now to be more fully described with reference to FIGS. 4 and 5, relates to a calculating machine with a ten-key keyboard for connection to an account-number checking apparatus. The checking apparatus is not further described or illustrated in this disclosure because equipment of this type is known, and details, other than the presence of suitable memory units or other signal-receiving units, are not essential to the invention proper. If desired, however, reference may be had, for example, to the account-number checking equipment disclosed in the copending application Ser. No. 475,417, filed July 28, 1965 of J. Verhoeff, from which it will also appear that instead of the above-described memory relays a memory system of magnetizable cores may readily be used.

Figure 4:
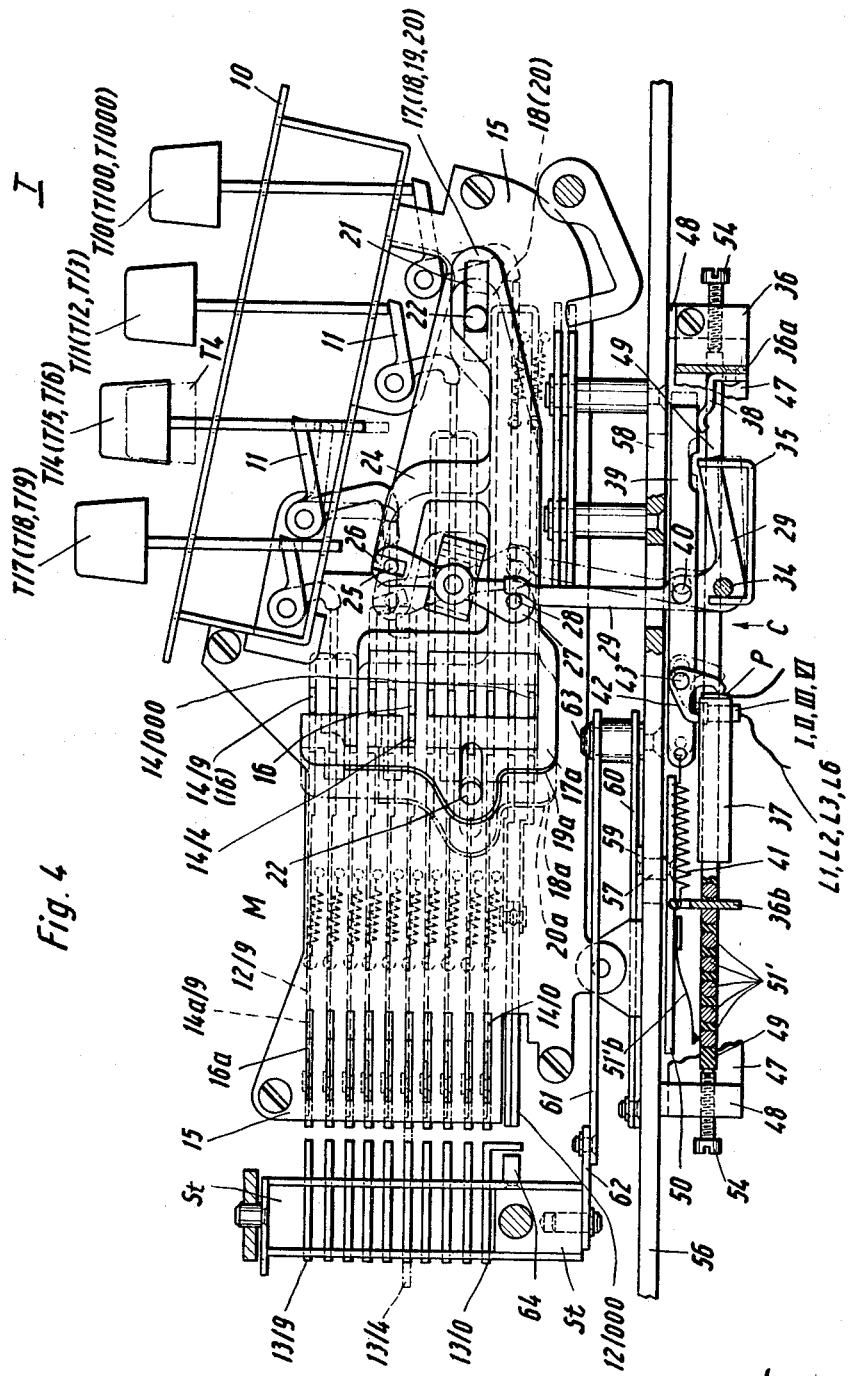
FIG. 4 is a side elevation of the ten-key keyboard in a calculating machine having a set-pin carriage, these devices forming part of a system as represented by the circuit diagram of FIG. 1.
Figure 5:
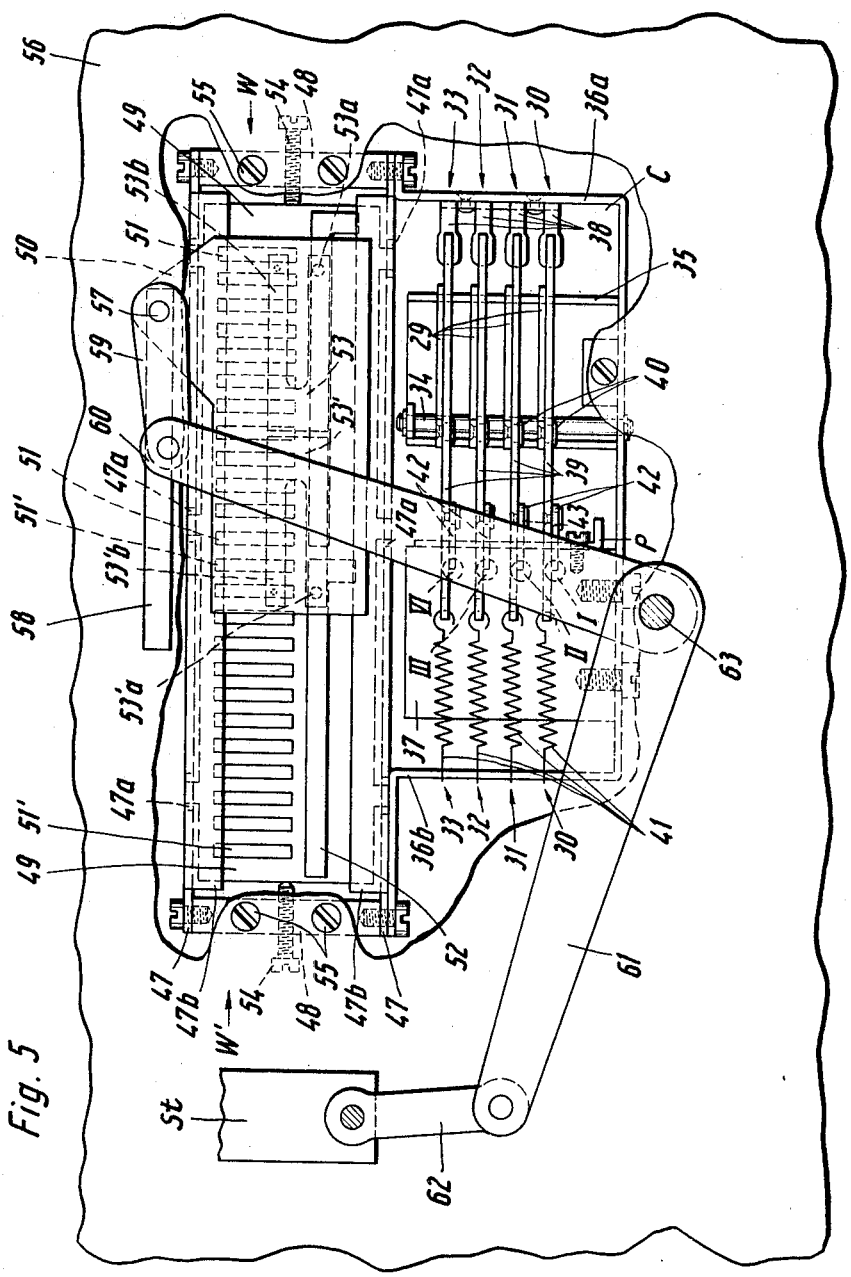
FIG. 5 is a plan view of part of the devices according to FIG. 4, including the encoder switches.

Before dealing with the particular embodiment shown in FIGS. 4 and 5, it may be mentioned that the fundamental electric circuitry of the embodiment is as described above with reference to FIGS. 1 and 1a, except for the addition of a second discriminator device W' which is likewise coupled with the carriage or other traveling machine member St whose position is indicative of the decimal or digit position of the amount being transmitted to the receiver. Furthermore, the discriminator W' has some of its bank contacts connected with the coil of a blocking or stop magnet SM. The purpose and functioning of these components in coaction with the encoder switch device C and with the movable machine member, in this case a set-pin carriage, will appear from the following in conjunction with FIGS. 4 to 10.

Figure 6:
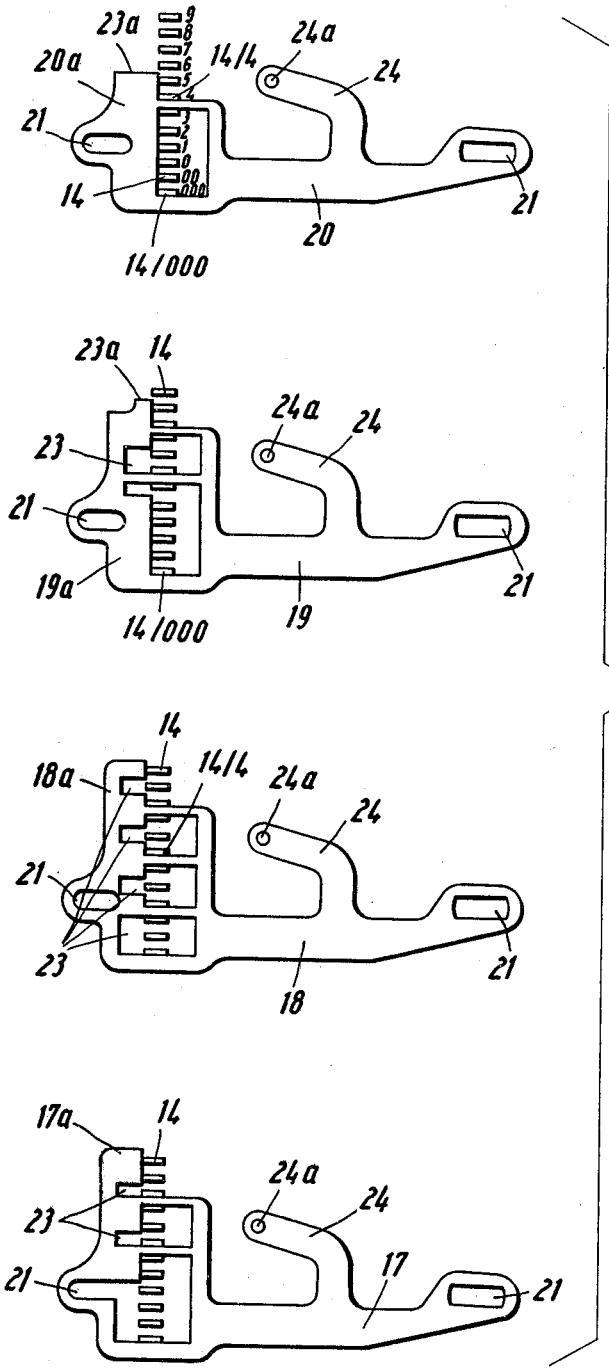
FIG. 6 is a lateral view of four code converting control sliders for the code 1–2–3–6, these sliders forming part of the apparatus shown in FIGS. 4 and 5.

The data-posting device T of the illustrated machine comprises a key bank 10 (FIG. 4) in whose frame structure the amount keys are guided for vertical key travel. The keys comprise three cipher keys T/000, T/00, T/0 and nine numeral keys T1 to T9. These keys act upon respective angular levers 11 which are fulcrumed on the frame structure and act in conventional manner upon control sliders 12/000 to 12/9. The slides are horizontally displaceable and arranged one above the other in an upwardly ascending sequence according to the ascending scale of values. Horizontal displacement of any one of the sliders by depression of the corresponding keys causes this slider to push one of the respective set pins 13/0 to 13/9 more deeply into the set-pin carriage St. The control sliders 12/000 to 12/9 are provided with lateral guide lugs 14 and 14a which engage longitudinal slots 16 and 16a respectively in the side walls 15 of the frame structure. The guide lugs 14 are extended so as to form entrainers which enter into coupling engagement with longitudinally displaceable encoder sliders 17, 18, 19 and 20 (FIGS. 4 and 6).

Both ends of the encoder sliders 17, 18 19 and 20 have oblong openings 21 by means of which the sliders are displaceably seated on pins 22 secured to one of the side walls 15. Each of the encoder sliders thus longitudinally displaceable, has an encoder head 17a to 20a (FIG. 6). The front edge of the head, facing the guide pins 14/000 to 14/999, is provided with recesses 23 or has a cut-away top 23a instead of one of these recesses. The recesses or cut-outs permit the appertaining guide pins 14/000 to 14/9 to freely move without entrainment of the encoder slider 17 to 20.

The encoding of the amounts (amounts 0 to 9) posted by means of the keys T/000 to T/9 is effected by displacing the respective encoder sliders 17 to 20 (FIG. 6) via the displacement of the control sliders 12/000 to 12/9 occurring during the downward travel of the keys. Thus there is displaced the slider 17 when posting 2, 3, 5, 6, 8 and 9;
slider 18 when posting 1, 3, 4, 6, 7 and 9;
slider 19 when posting 000, 00, 0, 1, 2, 6, 7 and 8;
slider 20 when posting 000, 00, 0, 1, 2, 3, 4 and 5.

Figure 2:
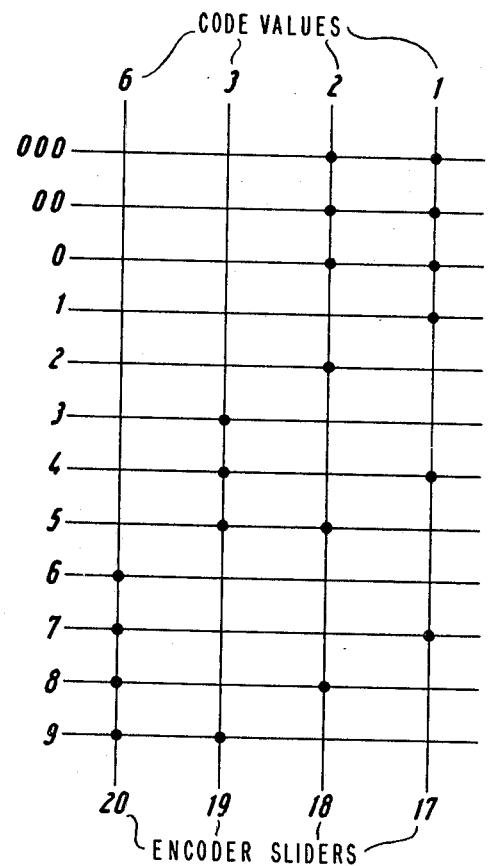
Figure 3:
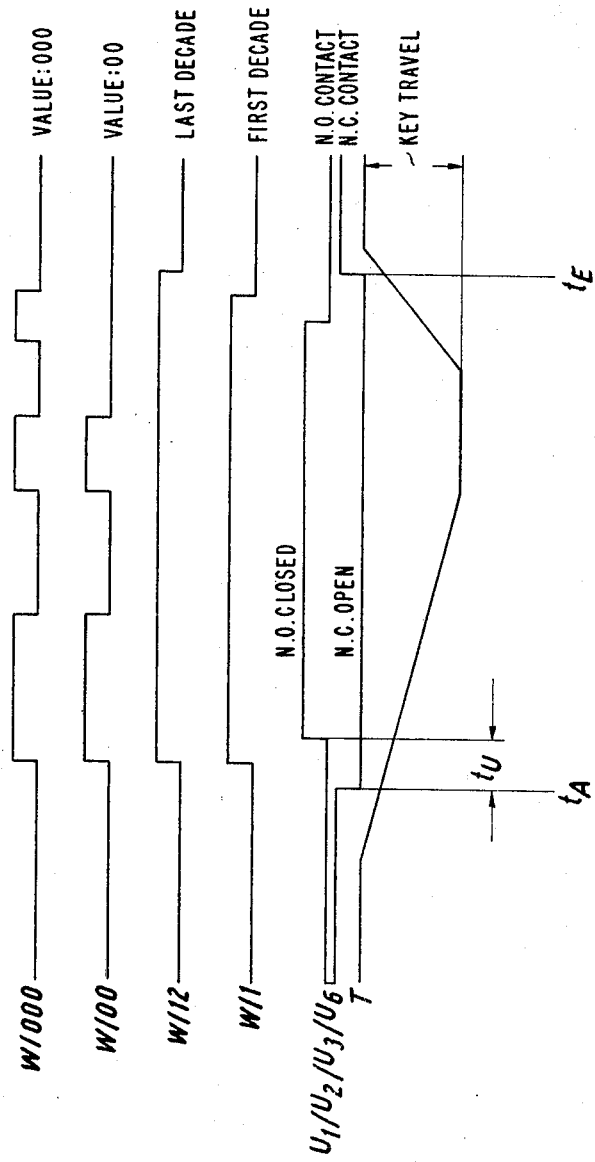
FIG. 3 is a graph of time curves relating to the operation of the system and apparatus shown in FIGS. 1, 4 and 5.

As mentioned, the encoding sliders 17, 18, 19 and 20 are schematically represented by the vertical lines in the code system diagram of FIG. 2. It will be seen that each of these sliders becomes active when posting those values that correspond to the non-marked intersections in the system diagram.

Figure 7:
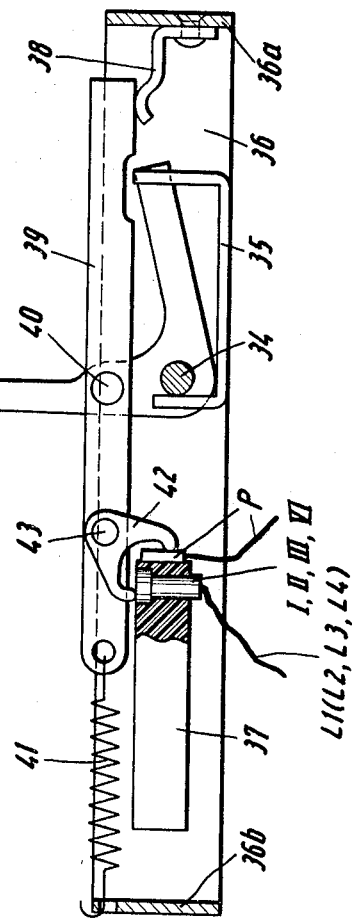
FIG. 7 is a side elevation partly in section of one of the normally closed encoder switches according to FIGS. 4 and 5.
Figure 8:
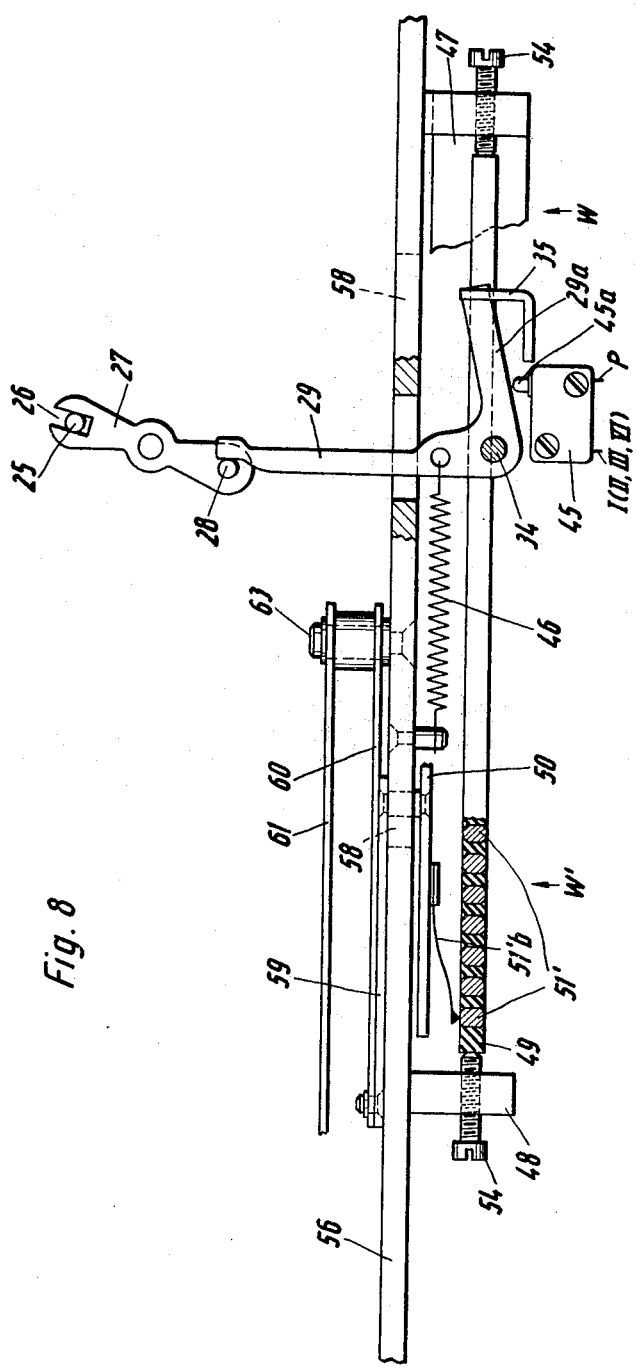
FIG. 8 is a lateral and partly sectional view of a discriminator device which forms part of the apparatus according to FIGS. 4 and 5 and is equipped with an encoder switch of the microswitch type.

Each encoding slider 17–20 has a lateral arm 24 (FIG. 6) whose end is provided with a bore 24a for receiving a coupling pin 25. As will further be seen from FIG. 4, the encoding sliders 17–20 have pin 25 straddled by the bifurcated end of a double-armed lever 27 whose fulcrum is fixed to the frame structure (FIGS. 7, 8). The other end of lever 27 carries a roller pin 28 engaging the actuator lever of an electrical switch 30, 31, 32 or 33 which forms part of the encoder device C already described above with reference to FIG. 1.

In the encoder switch device C (FIGS. 1, 5) the four switches 30, 31, 32 and 33 are mounted one beside the other, each being coupled by actuating lever 29 with one of the respective encoder sliders 17, 18, 19 and 20. These switches are of the non-bouncing type disclosed and claimed in my copending application Ser. No. 697,885, filed Jan. 15, 1968, to which reference may be had if further explanation, supplemental to the following, is desired.

When using switches having a normally closed (NC) contact only (FIGS. 5 and 7), the actuating lever 29 of each switch 30 to 33 is of angular shape and rotatably mounted on a pivot axle 34 common to all of these switches. The actuating levers 29 are laterally guided in a guide comb 35 which, as well as the axle 34, is mounted on a box-shaped base frame 36 fastened to the housing of the active contact transmitter proper (discriminator) W, W'. An insulating plate 37 attached to the frame 36 carries four fixed contacts I, II, III and VI for the respective value leads L/1, L/2, L/3, L/6 (FIG. 1). A pole bar (bus) P extends past the four contacts and is common to all of the switches on frame 36.

A deflectable and preferably adjustable abutment 38 is mounted for each switch on one leg 36a of the frame 36. Switch sliders 39 of insulating material rest upon the respective abutments 38 and are articulately linked by respective rivet pins 40 to the actuating levers 29. Pull springs 41 connect the sliders 39 with the other leg 36b of the frame 36 in such a manner that the switch sliders 39 can be reciprocated by pivotal movement of the respective actuating levers 29.

A fork-shaped contact bridge 42 is pivoted by a pin 43 to each of the switch sliders 39 and biased by the pull of the spring 41 to normally engage the appertaining one contact I, II, III or VI as well as the common pole bar P. Consequently, the switches 30 to 33 are normally closed through the respective members 42, when the encoder device C is in condition of rest. It will be noted that the fixed contacts I, II, III or VI and P are rigid and rigidly mounted so as to have the respective contact faces in each switch extend at a right angle to each other; and the bridge 42 is in itself also rigid, the contact pressure being provided by the slider 39 and the spring 41.

Figure 9:
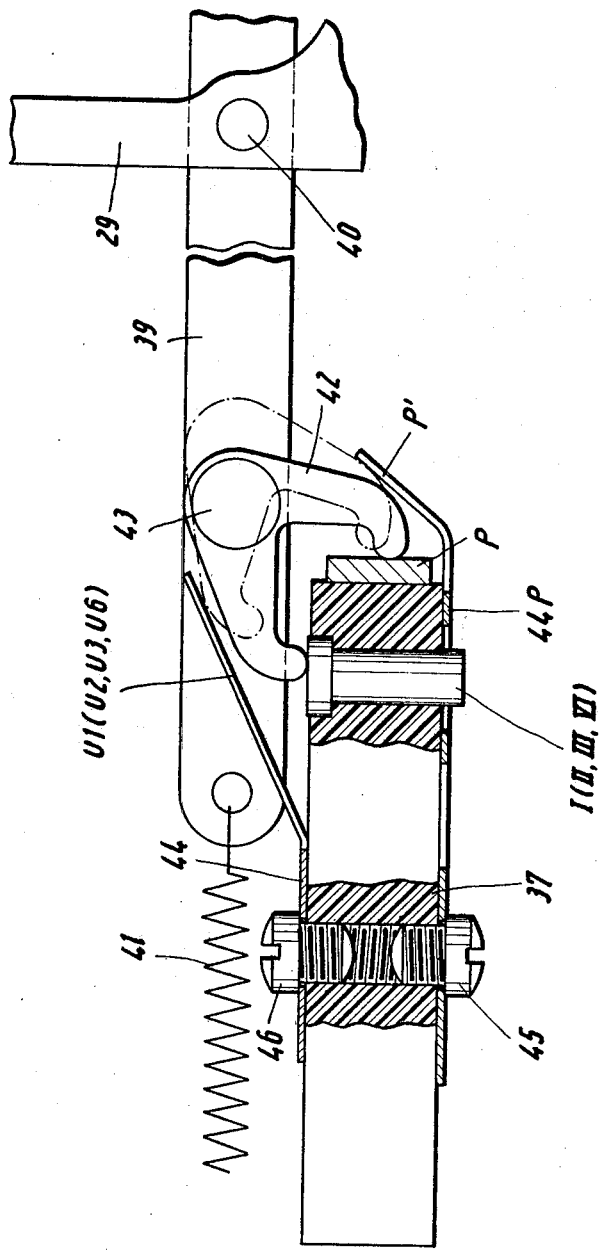
FIG. 9 is a partly sectional side elevation of another encoder switch which forms part of the apparatus according to FIGS. 4 and 5 and is designed as a two-way switch.
Figure 10:
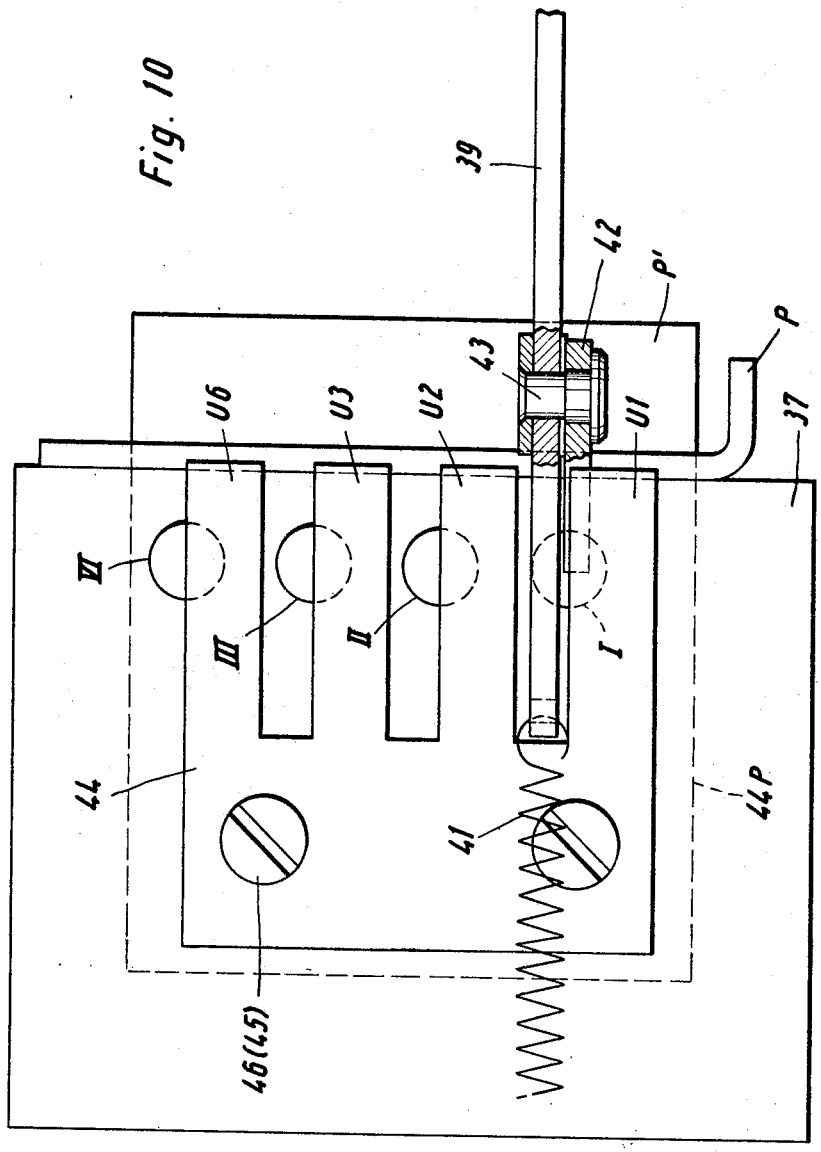
FIG. 10 is a plan view of the encoder switch shown in FIG. 9.

When using switches 30 to 33 that are designed as two-way switches in accordance with FIGS. 9 and 10, an upper contact plate 44 and a lower contact plate 44P are secured to the insulating plate 37 with the aid of screws 45 and 46. The lower contact plate 44P has its free end P' bent away from the plane of the plate so that this end forms a stop for the contact bridge 42. That is, in the active position (FIG. 9) of the switch slider 39, one leg of the contact bridge 42, illustrated by dot-and-dash lines, has its back resting against the end P' of the plate 44P in a position where the bridge 42 is reliably separated from the pole bar P. This lower contact plate 44P is common to all of the switches 30 to 32 of the same encoder switch device and may be metallically joined with the pole bar P in accordance with device C in the circuit diagram shown in FIG. 1.

Each upper contact plate 44 forms a tongue. The tongues U1, U2, U3 and U6 extend at a slant away from the plane of the plate 44 proper and are located in the pivoting range of the contact bridge 42 when the switch slider 39 is shifted to the right to its active position.

As will further be seen from FIGS. 4 and 5, the base frame 36 of the encoder switch device C is fastened to the frame of the digit position denoting scanner device W and W' and constitutes a single subassembly together therewith.

The discriminator device W, W' (FIG. 5) comprises a frame structure formed by two parallel bars 47 of angular cross section and two spacer blocks 48. The bars 47 have longitudinal slots 47a for holding and guiding a contact plate 49 which is longitudinally displaceable between the two bars 47. The angularly extending portion 47b of the bars 47 constitutes a guide for a contact slider 50. The contact plate 49 is composed of an insulating plate into which narrow flat contacts 51 and 51' are embedded in such a manner that their surfaces lie flush with the insulating surface in the top plane of the plate and their mutual spacing corresponds to the length of one travel step of the setpin carriage St. The contacts, in totality, thus form a bank to be sequentially engaged by a wiper contact. The number of the flat area contacts 51, 51' is in accordance with the number of digital positions (decades) of the calculating machine per contact-plate unit. Parallel to the bank of the flat contacts there extends a continuous current bus 52 which is correlated as the common pole to the flat contacts 51. In the illustrated example there are 12 flat contacts 51 and 12 flat contacts 51' which constitute part of the digit-position discriminator W and W'.

The two double spring contacts 53 and 53' are fastened to the contact slider 50 (FIGS. 1, 5). These double spring contacts have each a pair of contact tongues 53a and 53a', and 53b and 53b'. The tongues 53 and 53a' are in continuous contact engagement with the bus bar 52. In the inactive condition of the calculating machine the contact tongue 53b of the device W is always located on an insulating intermediate area between two flat contacts 51', and the tongue 53b of the device W' always engages one of the flat contacts 51'. Since the travel of the wiper spring contact 53 is always along the top plane of the contact plate 49 and does not ever involve a lifting movement away from the bank contacts, no contact bouncing or vibration in the opening sense of the wiper contact can occur. This is the reason why the issued signals are not affected by contact bouncing or the like mechanically caused trouble. This, of course requires the discriminator W be timed to ultimately close the selected signal circuits for isuing the signal, as is the case when using an encoder circuit as shown in FIG. 1a or when timing the closing of the NO-contacts U1, U2, U3, U6 to occur slightly prior to the next contact engagement of the wiper 53.

The contact plate 49, which may form a mechanically separate unit, is longitudinally displaceable with the aid of set screw 54 so that the switching point between the contact tongues 53b, 53'b and the bank contacts 51 or 51' can be accurately adjusted. The digit-position discriminator devices W and W' as well as the encoder device C are fastened by screw bolts to a partition or intermediate bottom of the frame structure of the calculating machine M.

The contact slider 50 carires a pivot pin 57 which extends through a guide slot 58 in the partition 56 of the frame structure and is connected by a link 59 with a lever 60 fulcrumed at 63 to the frame structure. Lever 60 is connected by an arm 61 and a link 62 with the set-pin carriage St so that the contact slider 50 travels in synchronism with the carriage St.

The performance of the apparatus with respect to the transmission of signals to the relay memory R of the number checking device E will now be described with reference to the circuit diagram of FIG. 1, the time diagram of FIG. 3, and the tetradic code according to FIG. 2. The apparatus is assumed to be equipped with two-way encoder switches according to FIGS. 9 and 10 rather than with the one-way switches according to FIGS. 1a, 4 and 7.

As explained, the signal lines W/1 to W/12, L/W, L(+) and L/1 to L/6 lead to the relay memory R composed of 12 decades, each decade having four relays for the bistable storing of the code values, 1, 2, 3, and 6 respectively (FIG. 1). It should be noted that the decade lines of the memory R are connected in the reverse sequence with the digit-position discriminator W by the appertaining leads W/1 to W/12.

In the second discriminator device W' the bank contacts 51'/1 to 51'/5 are are all connected with the blocking magnet SM. When this magnet receives voltage it blocks the release of the machine operation in known manner. That is, the magnet SM must be deenergized in order to permit a machine operation. For this purpose, the magnet SM may have an armature which mechanically controls a latch or which electrically controls a switch so as to effect the desired blocking and releasing operation, such devices being generally known in the art and for that reason not further illustrated and described herein.

The blocking magnet SM is also connected in a parallel circuit which is controlled in the conventional manner by a switch X of the number checking device E so that the blocking magnet SM can release a machine run only if both parallel connected energizing circuits are interrupted.

The mechanical-electrical performance will now be described with reference to the account number 40 003 to which is assigned the checking number 4 00036.

The posting sequence is 4–000–3–6. When posting the first numeral "4," the actuation of the key T/4 (FIG. 4) causes the appertaining angular lever 11 to turn clockwise, and the control slider 12/4 displaces the set pin 13/4 to the dot-and-dash position. During displacement of the control slider 12/4, the extended guide pin 14/4 entrains the encoder sliders 18 and 20 because no recess 23 is located in front of the guide 14/4 in the encoder heads 18a and 20a (FIG. 6). Thus, the encoder sliders 18 and 20 are shifted to the left (FIG. 4) to the dot-and-dash position. During shifting, the appertaining levers 27 turn counterclockwise and their roller pins 28 rotate the actuating levers 29 of switch members 31 and 33 (FIG. 5) clockwise about the axle 34 (FIG. 4).

If two-way switches according to FIGS. 9 and 10 are used (in lieu of those shown in FIGS. 4 and 5) the operation now effected by the switch members 31 and 33 (non-marked code values 2 and 6 in FIG. 2) is as follows:

The above-mentioned clockwise rotation of the actuating lever 29 about the pivot axle 34 (FIG. 4) causes the pin 40 to shift the switch slider 39 to the right in opposition to the pull of the spring 41. This releases the contact bridge 42 from its bridging engagement with the bus bar P and with the switch contact II or VI. Thus the circuits P–I and P–VI (FIG. 1) are opened. Within the switching intervals $t_U$ (FIG. 3) the fork-shaped contact bridges 42 abut against the angular end portion P' and against the tongue U2 or U6 of the respective contact plates 44P and 44 (FIG. 9) and thereby close the circuits U2–P and U6–P, since P and P' are conductively connected with each other. This position of contact bridge 42 is shown in FIG. 9 by dot-and-dash lines. Since further the contacts U1, U2, U3 and U6 are all connected to the positive bus L(+), the closing of any one of the NO-contacts U1 to P6 connects all of the NC-contacts I to VI to the live bus lead L(+) of the current source B (FIG. 1).

Subsequent to these switching movements, and as shown in FIG. 1, the current paths P–I and P–III in the encoder C are closed for the value "4," so that in all twelve decades the value relays or memory units R1 and R3 (denoting the code values 1 and 3) are connected with the positive pole of the current source B through the signals leads L/1 and L/3 respectively.

During each actuating travel of keys T/1 to T/9 a decade step of the step-pin carriage St is released in the conventional manner. As explained, the lever linkage 59 to 63 (FIGS. 4, 5) then effects a synchronous shift of the contact slider 50 in the digit-position discriminator devices W and W' by one digit position. During such stepwise advance of the devices W and W', a current flows for a short interval of time from the negative pole of the source B through the spring contact 53b and the bank contact 51/1 to the lead W/1 assigned to the digit position 1. The lead W/1 is connected to the four relays in the last (twelfth) decade but only the signal circuits for the relays R1 and R3 in this decade are now closed so that only these two relays will respond. Together with wiper contact 53b the wiper contact 53'b is shifted one digit position and, at the end of the shift rests upon the bank contact 51'/2 as shown in FIGS. 1 and 5. Consequently, the circuit of the blocking magnet SM remains closed and a calculating run of the machine cannot be released.

By shifting the contact plate 49 with the aid of the set screws 54, the time point between the mechanical and electrical contact can be displaced so that the desired performance with respect to time can be assured.

If suppression of bouncing effects is the foremost objective the plate 49 can be set to have the NO-contacts U1, U2, U3, U6 close prior to the beginning contact engagement of wiper contact 53 so that the signal pulses are issued by closing the signal circuits in the discriminator W. If the other objectives, such as the simplified circuitry, are decisive or if bouncing effects are sufficiently minimized by providing non-bouncing NO-contact switches (FIGS. 9, 10), the plate 49 can be set for securing the above-described operation according to FIG. 3. In this case, as explained, the closing of the signal circuits takes place at one of the NO-contacts U2 or U6 of a two-way switch at a moment subsequent to the commencement of the engagement between the spring contact 53 and the bank contact 51 (curves W/1 and W/12 in FIG. 3). Hence the mechanical contact engagement in the discriminator W before any current can flow.

After posting the first numeral "4" of the account number 40 003 (with the added check number 6), the three zeros are to be posted by actuating the triple-cipher key T/000. This causes the guide pins 14/000 to displace the encoding sliders 19 and 20, and the contacts P–III and P–VI in the encoder C (FIG. 1) are opened. Now the relays R1 and R2 in receiver E are connected to the positive pole of the current source through the contacts P–I, P–II and the respective signal leads L/1, L/2. During movement of the key T/000, the set-pin carriage St moves intermittently three digit steps in the known manner. The discriminator W, therefore, causes its wiper contact to sequentially connect the leads W/2, W/3 and W/4 for short intervals of time to the negative bus L(−). Accordingly the relays 1 and 2, conjointly denoting the value "zero," respond in each of the second, third and fourth decades, whereafter the number 4000 is entered into the memory R of the receiver E.

Now the numeral "3" is posted by depressing the key T/3. This controls the encoding sliders 17, 18 and 20 to open the respective switch contacts I, II and VI so that when the next following bank contact 51/5 is engaged by the wiper contact 53 of the discriminator W, the value "3" is stored by the memory relay R3 of the fifth decade.

When thereafter posting the checking numeral "6," the encoding sliders 17, 18 and 19 enter the value "6" through signal line L/6 into the relay R6 of the sixth decade. When the actuating movement of the key T/6 is terminated, the wiper contact 53' of the device W' is located on bank contact 51'/6 which is not connected with the preceding bank contacts 51'/1 to 51'/5 so that one of the two parallel circuits for the blocking magnet SM is now interrupted. If the posted numeral coincides with the checking numeral in the number checking device E, the device E opens its switch X and the blocking magnet SM is also disconnected at the parallel testing line L/W so that a machine run can thereafter be released.

The control of the blocking magnets by means of the auxiliary discriminator device W' has the further effect that the posted amount is additionally checked with respect to its number of decimal digits. In other words, in the example described in the foregoing, no machine run can be released unless the amount posted into the machine has at least six decimal digit positions.

The device W' running in synchronism with the digit-position discriminator W, may also be used for other control purposes. For example, the bank contacts W'/1 to W'/12 may be connected with shignal lamps in order to visually indicate by optical means the number of digits posted into the machine.

In value-signal issuing devices in which any current peaks occurring at the initial moment of mechanical contact engagement by the wiper contact members 51 and 53 are not significant or are minimized by electrical circuit components—such phenomena being not due to mechanical bouncing—the switches of the encoder C need be provided only with NC-contact members according to FIG. 7 or with a microswitch 45 according to FIG. 8. The circuit diagram is then slightly modified by having the bus lead L(+) extend from the current source B(+) directly to the common pole P of the encoder switches as shown in FIG. 1a. The current pulse is released in the digit-position discriminator W at the moment when its wiper contact 53b (FIG. 5) enters into mechanical contact engagement with one of the bank contacts 51/1 to 51/12.

It will be understood from the above-described method and apparatus that the invention secures the direct issuance of value signals in coded form under control by the ten-key board of a calculating or similar machine without the necessity of having a machine run released.

Calculating machines with a ten-key board T/1 to T/9 and several cipher keys T/0, T/00 and T/000 have the property that when zeros are posted prior to posting a finite numeral, the set-pin carriage St will jump to the corresponding decade, and that during subsequent posting of any finite values commencing with "1" the position of the decade indicator is of no effect upon the calculation. Since according to the invention the travel of the set-pin carriage St causes the digit-position discriminator devices W and W' to issue current pulses without releasing a machine run that effects the calculation, any previously posted zeros will have the effect of placing the values to be used for calculating or comparing purposes into the wrong decade row of a signal receiver E connected to the apparatus. In this respect, somewhat different operating instructions are needed.

However, the posting of zeros prior to posting a finite numeral can also be prevented by automatic means. In the illustrated embodiment, such faulty operation is obviated by providing the set-pin carriage St with a stop pin 64 that prevents the displacement of the zero sliders 12/00 to 12/000 (FIG. 4) and is released by the posting of a finite numeral.

Figure 11:
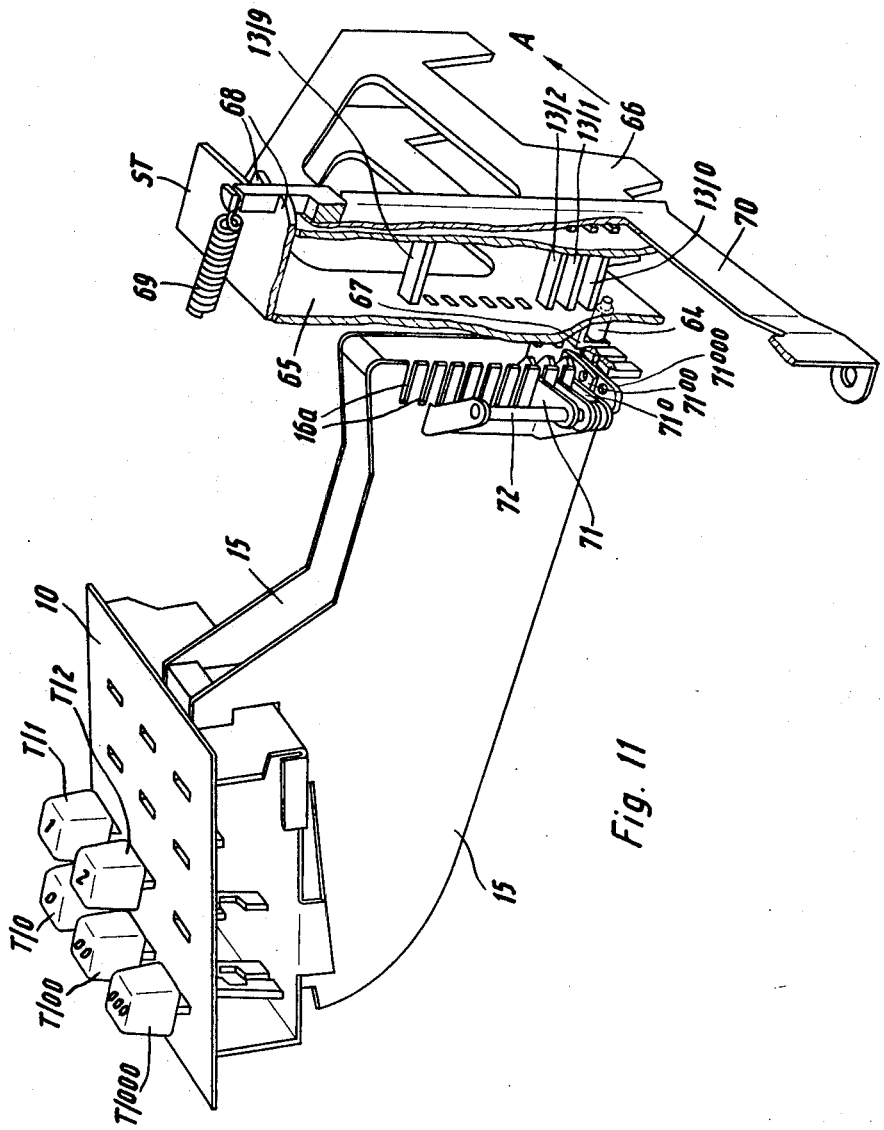
FIG. 11 is a schematically perspective view of a cipher-key blocking mechanism and FIG. 12 is a front view of a set-pin carriage, both forming part of the apparatus according to FIGS. 1 to 6.
Figure 12:
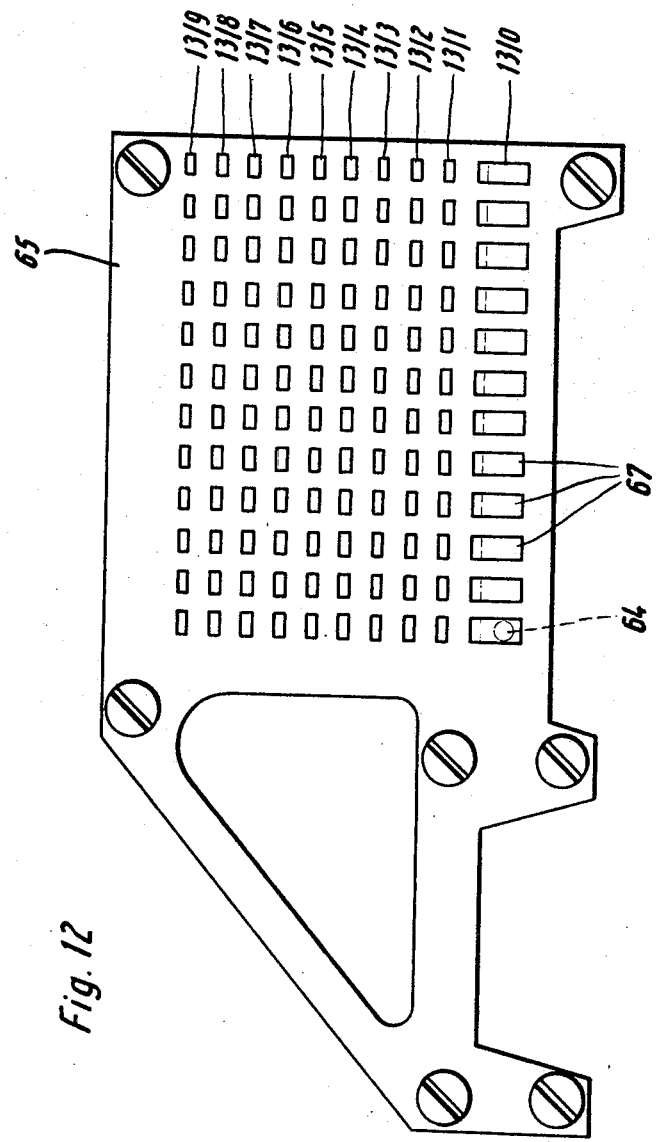

This blocking mechanism is more fully apparent from FIGS. 11 and 12. The set-pin carriage St in the illustrated apparatus comprises a front wall plate 65 and a rear wall plate 66 (FIGS. 11, 12) which are both provided with rectangular openings in which the longitudinally displaceable set pins 13/1 to 13/9 are guided. The openings and set pins are arranged in horizontal rows and vertical columns, the pins in each decade denoting the respective values between "1" and "9" in the decimal system, or corresponding digit values in other numerical systems. The lowermost row of pins 13/0 is coordinated to the respective cipher keys T/0, T/00, T/000 and each of these pins carries a lateral lug 67. A fixed stop pin 64 is fastened to the front plate 65 and extends from this plate toward the lug 67 of the set pin 13/0 in the first digit position. The fixed stop pin 64 prevents displacement of the zero set pin 13/0 as long as the carriage St is in the first digit position.

The set-pin carriage St is provided with a longitudinal row of gear teeth 68 FIG. 11 similar to those of a rack. The teeth are engaged by a control lever 70 which is displaceable in opposition to the pull of a spring 69 and is in active connection with the individual set pins 13/1 to 13/9 and 13/0. The keys T/0 to T/9 are articulately joined with control levers 71 which are guided in slots 16a and are pivoted for rotation about a common axle 72. One of the respective set pins 13/1 to 13/9 is coordinated to each of the control levers 71 arranged above one another.

Also journalled on the pivot axle 72 are three control levers 71°, 72°° and 71°°° which are connected with the appertaining cipher keys. The control lever 71° is correlated to the "0"-key and actuates one zero set pin 13/0, the control lever 71°° is coordinated to the "00"-key and actuates two zero pins 13/0 simultaneously, the control lever 71°°° is correlated to the "000"-key and simultaneously actuates three zero set pins 13/0 in respective digit positions (decades) located beside each other.

The blocking mechanism operates as follows.

When posting any finite numeral between 1 and 9 by depressing the corresponding Key T/1 to T/9, the appertaining one control lever 71 is turned clockwise and displaces the coordinated set pin 13/1 to 13/9. This moves the control lever 70 out of engagement with the teeth 68, and the set-pin carriage is transported by a spring (not illustrated) one digit step in the direction of the arrow A (FIG. 11). With each further posting of a numeral by the actuation of one of the keys T/1 to T/9, the carriage advances another digit step. When after posting a finite numeral, one of the cipher keys T/0, T/00 or T/000 is being depressed, the carriage is shifted one, two or three digit steps respectively. For example, the carriage moves two digit steps when depressing the key T/00. After releasing a machine run, the numerical values are then entered into the corresponding digit positions of the counting and printing mechanism. The plural-position transport by actuation of the "00" or "000" is effected by virtue of the fact that the control levers of the cipher keys T/00 or T/000 actuate either two or three mutually adjacent set pins 13/0.

However, if the operator depresses a cipher key T/0,

T/00 or T/000 prior to posting any finite numeral between 1 and 9, the set-pin carriage St cannot advance because the zero set pin 13/0 of the first digit position has the rear face of its lug 67 pressed against the stop pin 64 which prevents the control lever 70 from moving out of engagement with the teeth 68. Consequently, the propulsion spring of the carriage cannot become effective.

The prevention of carriage travel from its base position can also be effected by permitting the cipher keys to be actuated but locking the movement of the set-pin carriage by electromechanical or other electrical means designed and operating in analogy to the design and performance of the mechanism described in the foregoing.

To those skilled in the art it will be apparent from a study of this disclosure that my invention permits of various modifications and hence may be given embodiments other than those particularly illustrated and described herein, without departing from the essential features of my invention and within the scope of the claims annexed hereto.

I claim:

1. A method for issuing electrically clean signal pulses by contact switching in accounting, calculating and the like machines having value-posting key means, data-denoting signal pulse circuits with respective contact switch means selectively controllable by said key means and a bank of contacts in series with said respective switch means, which method comprises the steps of holding all of said contact switch means in said data-denoting signal circuits closed when said key means are in the inactive condition, opening during actuation of said key means but prior to issuance of a control pulse all those of said switch means in said signal circuits that do not denote the value posted by said key means, engaging a selected one of said bank contacts by wiper contact means, and issuing a control pulse through said engaged bank contact and through the other, then still closed ones of said switch means.

2. The method according to claim 1 for issuing coded control signals in machines whose amount-posting key means form a keyboard of the ten-key type, the machine having a displaceable member positionally correlated to the digit positions of the amounts being posted, which method comprises first converting the value denoted by an actuated key means into a code selection of said signal circuits by opening said switch means in all of those signal circuits that do not form part of said code selection, advancing said wiper contact means along the bank of contacts into contact engagement with a selected one of said bank contacts substantially in synchronism with the advance of said digital-positional member, and issuing a control pulse to the code selection of signal circuits through the then engaged bank contact and the other, then closed ones of said switch means.

3. Apparatus for issuing electric control pulses in accounting, calculating and the like machines, comprising value-posting key means; data-denoting pulse signal circuits with respective contact switch means selectively controllable by said key means, said switch means being closed when said key means are in the inactive condition, selective actuating means controlled by actuation of said key means and connected to said contact switch means for opening all those of said switch means in said signal circuits that do not denote the value posted by said key means; a digit-position discriminator having a bank of digit-position denoting contacts serially connected with said switch means in said respective signal circuits and having movable wiper contact means sequentially engageable with said bank contacts; displaceable data transmitting means releasable for incremental advance by actuation of said key means and in controlling connection with said wiper contact means for causing it to sequentially engage one of said respective bank contacts so as to issue said control pulses through the engaged one of said bank contacts and through the remaining, then still closed contact switch means.

4. Apparatus for issuing electric control pulses in accounting, calculating and the like machines, comprising amount-posting key means of the ten-key keyboard type, an encoder device having a data-denoting signal circuit for each code bit and having an encoder switch with a normally closed switch contact series connected in each of said signal circuits, selective actuating means controlled by actuation of said key means and connected to said encoder device for opening said contacts of all of those encoder switchts that appertain to other than the signal circuits participating in issuing the encoded signals, a digit-position discriminator having a bank of digit-position denoting contacts serially connected with said encoder switch contacts in said respective signal circuits and having movable wiper contact means sequentially engageable with said bank contacts; incrementally advancing data transmitting means releasable for digit-by-digit advance by actuation of said key means and in controlling connection with said wiper contact means for causing it to sequentially engage said bank contacts for issuing said control pulses through the engaged one of said bank contacts and through the remaining, then still closed encoder switch contacts.

5. In apparatus according to claim 4, said encoder device embodying a tetradic code and said data-denoting signal circuits being four in number with four of said encoder switches in said respective signal circuits, said key means comprising a plurality of cipher keys for posting one and more zeros respectively, said encoder device having for all of said cipher keys the same combination of code bits which combination corresponds to the joint code for two finite numerals, and said data transmitting means and said wiper contact means being releasable by each plural-cipher key to sequentially perform a corresponding plurality of digital advances.

6. Apparatus according to claim 5, comprising a receiver having rows of signal responsive members, said rows being assigned to sequential digit positions and containing one of said respective members for each digit value, the members of each row being serially connected between the same one of said respective encoder switches and different ones of said discriminator bank contacts, and current supply means connected between said wiper contact means and said encoder device.

7. In apparatus according to claim 5, said selective actuating means comprising encoder sliders (17–20) coupled with said key means and displaceable by key actuation, said encoder switches having movable actuating members respectively, and means selectively coupling said sliders to said actuating members for causing said actuating members to open said encoder switch contacts.

8. In apparatus according to claim 7, said data transmitting means of the machine comprising a set-pin carriage having value-setting control sliders, said encoder sliders having respectively different entrainer means engageable with said control sliders for causing the selective displacement of said control sliders to transfer of the posted amounts to said control sliders of said carriage.

9. In apparatus according to claim 8, said entrainer means forming a head portion of each of said encoder sliders, said control sliders of said carriage having a pin for entrainment by said head portions, and said respective head portions having different entrainer profiles respectively for entraining different ones of said pins.

10. In apparatus according to claim 9, saild head portions having a cut-away edge portion for free movement relative to the pins of selected ones of said control sliders, whereby only those pins of the control slides are entrained which the code requires to be displaced.

11. In apparatus according to claim 4, wherein said normally closed switch contacts of said encoder switches are designed as bouncing-free switch devices.

12. In apparatus according to claim 4, said data transmitting means comprises a set-pin carriage of the machine, said discriminator having a contact slider on which said wiper contact means is mounted, and a lever mechanism linking said carriage with said contact slider for advancing said contact slider in synchronism with the stepwise advance of said carriage.

13. In apparatus according to claim 12, said discriminator comprising a plate carying said bank contacts, and means for adjusting the position of said plate relative to travel direction of said contact slider.

14. In apparatus according to claim 13, said discriminator comprising a second digit-position discriminating selector having a second bank of digit-position denoting contacts and a second wiper contact means mounted on said contact slider and normally in contact engagement with one of said contacts of said second bank.

15. In apparatus according to claim 14, said two wiper contact means consisting of respective spring contact members electrically insulated from each other.

16. In apparatus according to claim 15, said discriminator having a pole bus bar extending along the travel path of said contact slider, said two spring contact members being in gliding conductive connection with said bus bar.

17. In apparatus according to claim 4, said encoder switches consisting each of a non-bouncing double-pole switch having a normally open contact which closes after the openings of said respective normally closed contact.

18. In apparatus according to claim 17, said signal circuits having a common current supply connected to said normally open contacts, said latter contacts being opened after said wiper contact means have commenced engaging one of said respective bank contacts.

19. In apparatus according to claim 17, said encoder device and said discriminator having a mounting frame structure in common so as to conjointly form a single subassembly of the machine.

References Cited

UNITED STATES PATENTS

| | | | |
|---|---|---|---|
| 3,028,080 | 4/1962 | Schwend | 235—61.6 |
| 3,059,845 | 10/1962 | Breitling et al. | 235—60.4 |
| 3,139,821 | 7/1964 | Holmquist | 101—93 |
| 3,202,350 | 8/1965 | Pinard | 235—59 |

STEPHEN J. TOMSKY, Primary Examiner

U.S. Cl. X.R.

235—61; 340—365